United States Patent
Eymann et al.

(10) Patent No.: US 8,451,947 B2
(45) Date of Patent: May 28, 2013

(54) BURST DEMODULATOR

(75) Inventors: Steven Eymann, Phoenix, AZ (US); Phil Reum, Tempe, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 938 days.

(21) Appl. No.: 12/553,045

(22) Filed: Sep. 2, 2009

(65) Prior Publication Data
US 2010/0054379 A1 Mar. 4, 2010

Related U.S. Application Data

(60) Provisional application No. 61/093,496, filed on Sep. 2, 2008.

(51) Int. Cl.
*H04L 27/00* (2006.01)
(52) U.S. Cl.
USPC .......................................... 375/324
(58) Field of Classification Search
USPC .......................................... 375/324
See application file for complete search history.

(56) References Cited

U.S. PATENT DOCUMENTS

| | | | |
|---|---|---|---|
| 6,545,532 B1 * | 4/2003 | Maalej et al. | 329/304 |
| 2008/0152033 A1 * | 6/2008 | Gore et al. | 375/260 |

* cited by examiner

*Primary Examiner* — Chieh M Fan
*Assistant Examiner* — Tanmay Shah
(74) *Attorney, Agent, or Firm* — Booth Udall Fuller, PLC (57) ABSTRACT

A burst demodulator. Implementations may include a first frequency estimating module adapted to remove a first frequency offset from a plurality of data samples. A second frequency estimating module may be coupled with the first frequency estimating module and may be adapted to remove a second frequency offset from the plurality of data samples. A third frequency estimating module may be coupled with the second frequency estimating module and may be adapted to remove a third frequency offset from the plurality of data samples. A clock phase estimating module may be coupled with the third frequency estimating module and may be adapted to calculate a clock phase offset value, select one or more coefficients for a finite impulse response (FIR) filter, and process the plurality of data samples with the FIR filter. A data processing module may be adapted to recover the data included in the plurality of data samples.

18 Claims, 5 Drawing Sheets

BURST DEMODULATOR

CROSS REFERENCE TO RELATED APPLICATIONS

This document claims the benefit of the filing date of U.S. Provisional Patent Application 61/093,496, entitled "Burst Demodulator" to Eymann et al., which was filed on Sep. 2, 2008, the disclosure of which is hereby incorporated entirely herein by reference.

BACKGROUND

1. Technical Field

Aspects of this document relate generally to signal processing systems and methods for telecommunication systems, such as satellite systems.

2. Background Art

Conventionally, telecommunications systems involve the transmission of data across a communications channel using an electromagnetic signal that may take many forms. Because data to be transmitted is often altered via processing prior to transmission, the received signal is often processed by a demodulator that retrieves the data from the received signal. An example of a conventional demodulator may be found in U.S. Pat. No. 7,117,235 to Cannon entitled "Digital Decimation Filter Having Finite Impulse Response (FIR) Decimation Stages," issued Oct. 3, 2006, the disclosure of which is hereby incorporated herein entirely by reference. As illustrated in the patent to Cannon, feedback loops to allow for detection of offsets in the phase of the received carrier signal and systems to detect and acquire the symbol clock are conventionally used to assist the demodulator with retrieval of the data being transported via the carrier signal.

SUMMARY

Implementations of a burst demodulator may include an analog to digital converter (A/D) coupled with a complex multiplier coupled with a direct digital synthesizer (DDS) where the complex multiplier and the DDS are adapted to remove known frequency errors. Implementations may also include a decimating Nyquist filter coupled with the complex multiplier and adapted to produce a plurality of burst samples including a plurality of preamble samples and a plurality of data samples. A first frequency estimating module may be coupled with the decimating Nyquist filter and may be adapted to receive the plurality of preamble samples, calculate a first calculated frequency offset value using the plurality of preamble samples, and remove a first frequency offset from the plurality of data samples using the first calculated frequency offset value. A second frequency estimating module may be coupled with the first frequency estimating module and may be adapted to receive the plurality of preamble samples, calculate a second calculated frequency offset value using the plurality of preamble samples, and remove a second frequency offset from the plurality of data samples using the second calculated frequency offset value. A third frequency estimating module (peak detection module) may be coupled with the second frequency estimating module and may be adapted to receive the plurality of preamble samples and to calculate a peak location of correlation magnitude using the plurality of preamble samples. A clock phase estimating module may be coupled with the third frequency estimating module and may be adapted to receive the plurality of preamble samples and the peak location of correlation magnitude, calculate a clock phase offset value using the plurality of preamble samples and the peak location of correlation magnitude, select one or more coefficients for a finite impulse response (FIR) filter using the clock phase offset value, and process the plurality of data samples with the FIR filter. A data processing module may be coupled with the clock phase estimating module and may be adapted to recover the data included in the plurality of data samples.

Implementations of a burst demodulator may include one, all, or any of the following:

The clock phase estimating module may further include a temperature compensated crystal oscillator (TCXO).

The clock phase estimating module may further include an oven controlled crystal oscillator (OCXO).

The data processing module may be adapted to recover the data using a forward error correction (FEC) decoder with short block turbo codes.

The data processing module may be adapted to recover the data using a forward error correction (FEC) decoder with short block low density parity check (LDPC) codes.

The system may not include a feedback loop adapted to correct frequency offset during burst acquisition.

The system may include one or more automatic gain control (AGC) modules.

The plurality of preamble samples may be a unique word adapted to demodulate the burst.

Implementations of burst demodulators may utilize implementations of a method of feed forward burst demodulation. Implementations of the method may include receiving a plurality of burst samples comprising decimated complex samples from a plurality of received symbols in a burst transmission. The method may also include identifying the start of a preamble of a burst within the plurality of burst samples, selecting a plurality of computation samples from the burst samples that follow the start of the preamble in a sequence of the burst samples, and calculating a first calculated frequency offset using a predetermined first percentage of the computation samples and processing the burst samples with the first calculated frequency offset value. The method may include calculating a second calculated frequency offset using a predetermined second percentage of the computation samples and processing the burst samples with the second calculated frequency offset value. The method may also include calculating a peak location of correlation magnitude using the computation samples. The method may include calculating an index value for a clock phase lookup table using the computation samples and the peak location of correlation magnitude as well as determining coefficients for a finite impulse response (FIR) filter using the clock phase lookup table and the index value. The method may also include processing the burst samples through the FIR after calculating the index value and retrieving data from the burst samples using a data processing module.

Implementations of a method of feed forward burst demodulation may include one, all, or any of the following:

Calculating the second calculated frequency offset may further include splitting the preamble into two equal parts separated by a predetermined number of symbols if the preamble includes 128 symbols.

The predetermined first percentage of the computation samples may be greater than 50 percent of the computation samples and the predetermined first percentage may be created by adding one or more of the computation samples together.

The determined second percentage of the computation samples may be 50% of the computation samples and the predetermined second percentage may be created by adding half of the computation samples to the other half of the computation samples.

Implementations of a burst demodulator may utilize implementations of another method of feed forward burst demodulation. Implementations of the method may include receiving a plurality of burst samples where the burst samples include decimated complex samples from a plurality of received symbols in a burst transmission. The method may also include identifying the start of a preamble of a burst within the plurality of burst samples and selecting a plurality of computation samples from the burst samples that follow the start of the preamble in a sequence of the burst samples. The method may include determining a peak location of correlation magnitude between a sign of a reference preamble pattern and the computation samples and determining a correlation magnitude at a first location and a correlation magnitude at a second location on each side of the peak location of correlation magnitude. The method may also include defining as a reference location of correlation magnitude the larger of the correlation magnitude at the first location or the correlation magnitude at the second location. The method may also include performing a dot product of the reference preamble pattern with the computation samples, forming a first vector of real results and a second vector of imaginary results. The method may include taking the time derivative of the first vector and of the second vector and averaging the resulting values to form a third vector and a fourth vector, respectively, and performing a dot product of the third vector and the fourth vector with the plurality of burst samples. The method may also include performing a dot product of the reference preamble pattern with the computation samples to produce a fifth vector of real results and a sixth vector of imaginary results and adding a predetermined number of the terms within the fifth vector to a predetermined number of terms within the fifth vector and adding a predetermined number of the terms within the sixth vector to a predetermined number of the terms within the sixth vector. The method may include taking the time derivative of the remaining terms in the fifth vector and in the sixth vector and averaging the resulting values, respectively, to produce seventh and eighth vectors and performing a dot product of the seventh vector and the eighth vector with the plurality of burst samples. The method may also include performing a matrix multiplication of the computation samples with the sign of the reference preamble pattern to produce a complex phase offset value and multiplying the plurality of burst samples with the complex phase offset value. The method may include performing a matrix multiplication of the computation samples with the sign of the preamble at the peak location of correlation magnitude, the first location of correlation magnitude, and the second location of correlation magnitude and calculating an index value for a lookup table of coefficients for a finite impulse response (FIR) filter using the ratio of the reference location of correlation magnitude to the peak location of correlation magnitude and whether the reference location of correlation magnitude is the first location of correlation magnitude or the second location of correlation magnitude. The method may also include processing the burst samples with the FIR filter and sending the burst samples at the symbol rate to the data processing unit.

Implementations of another method of feed forward burst demodulation may include one, all, or any of the following:

Adding a predetermined number of the terms within the first vector to a predetermined number of the terms within the first vector and adding a predetermined number of terms within the second vector to a predetermined number of terms within the second vector before taking the time derivative of the first vector and of the second vector. Adding a predetermined number of the terms may further include adding more than 50% of the terms in each of the respective vectors together.

Splitting the preamble into two equal parts separated by a predetermined number of symbols if the preamble contains 128 symbols. Splitting the preamble into two equal parts separated by a predetermined number of symbols may further include separating the two equal parts by 192 symbols.

Adding a predetermined number of the terms within the fifth vector to a predetermined number of terms within the fifth vector and adding a predetermined number of terms within the sixth vector to a predetermined number of the terms within the sixth vector may further include adding half of the terms in each of their respective vectors together.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended burst demodulator and/or assembly procedures for a burst demodulator will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such burst demodulators and implementing components, consistent with the intended operation.

Figure 1:
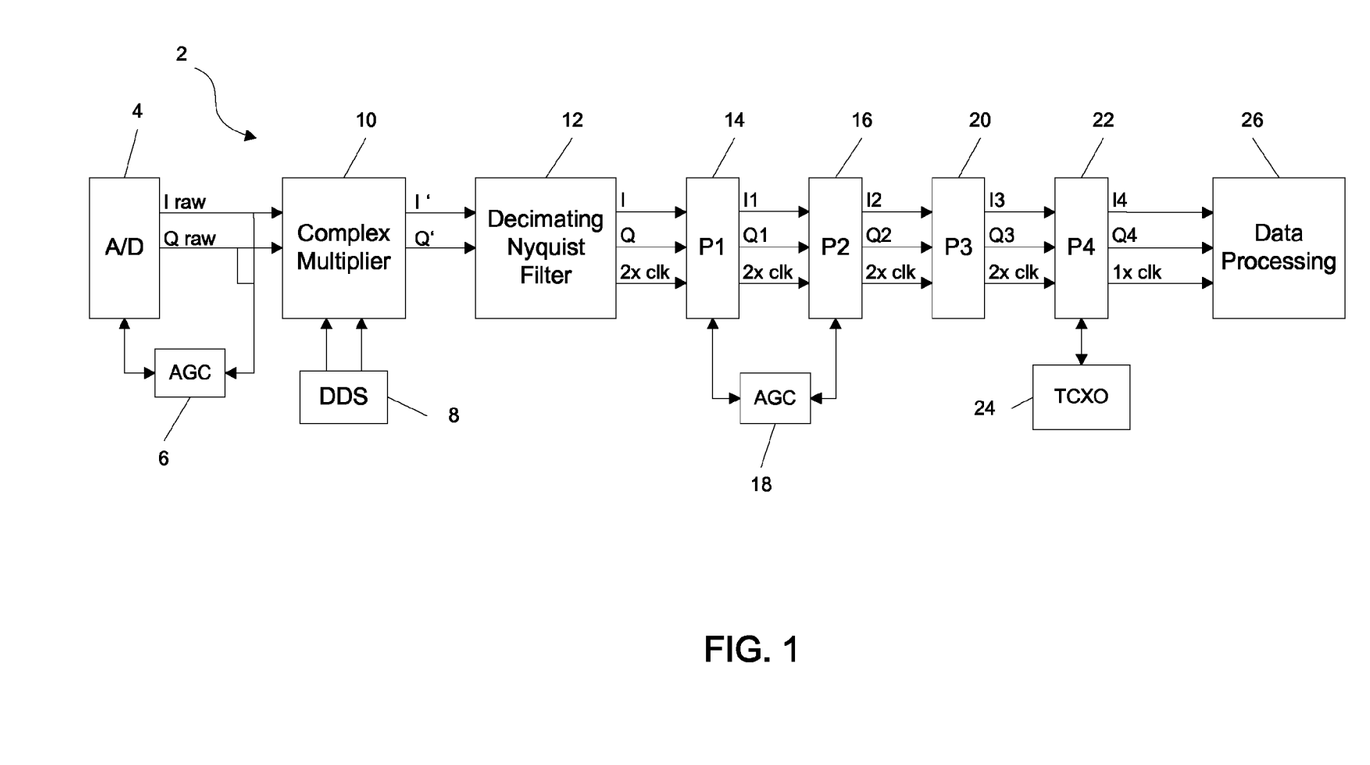
FIG. 1 is a block diagram of an implementation of a burst demodulator.

Referring to FIG. 1, an implementation of a burst demodulator 2 is illustrated. Implementations of burst demodulators 2 may receive burst transmitted complex signals (I and Q) formatted in several modulation formats, including, by non-limiting example, Quadrature Phase Shift Keyed (QPSK), 8-Phase Shift Keyed (8PSK), Binary Phase Shifted Keyed (BPSK), and any other modulation type. Because the signals received are transmitted in bursts, such as the transmissions used in time division multiple access (TDMA) type systems, the signal may include a plurality of frames ordered in time order of transmission. Within each frame is a plurality of time slots assigned to each user of the system, allowing each user to transmit a burst of data during the period of time allotted by the time slot. When a user has used the time allotted by the time slot, the user waits until the next frame and again transmits during the assigned time slot. Because the information within the frames and the frames themselves are transmitted in bursts, and not via a continuous connection between the uplink and downlink stations, each frame has conventionally contained a preamble that is used by a demodulator tasked with recovering the data from each burst as it is received. Conventional preambles include the sending of X symbols of pure carrier for acquisition of the carrier signal being used to transmit the data followed by Y symbols of a pattern rich in energy at the symbol clock to allow for clock acquisition then followed by Z symbols that form a unique word to allow the demodulator to identify the start of the data portion within the frame (burst). The symbols used in the preamble take away from the total capacity of the frame and, based on the type of symbols used, require various hardware components to be included in the system to enable the demodulation of each frame.

Conventional burst demodulators also rely on a frequency feedback process to enable tracking of frequency shifts induced by individual transmit frequency errors, frequency errors caused by the inherent stability of the local reference clock, or frequency shifts caused by satellite offset. By the use of structures like a Costas loop, for example, the frequency of the carrier can be identified and tracked from frame to frame (burst to burst). Because of the use of feedback structures, the use of a preamble that contains specifically ordered carrier and clock acquisition symbols is needed.

In particular situations, such as in some particular implementations where the frequency offsets caused by transmit errors represent about 6.25% of the symbol rate, the preamble portion of the burst can be adapted to support a feed forward burst demodulation method using a hardware configuration that does not utilize a feedback process. As illustrated in FIG. 1, the symbols from a burst at a near baseband intermediate frequency are received by an analog to digital (A/D) converter 4, which is coupled to an automatic gain controller 6 that monitors the raw complex outputs of the A/D converter 4 to prevent saturation of the converter 4. For this particular implementation, a Direct Digital Synthesizer (DDS) 8 is used to drive a complex multiplier 10 which is used to cancel known sources of frequency offset, such as those introduced by the granularity of the intermediate frequency (IF) phase locked loop (PLL) used during frequency down conversion and known systemic frequency errors, from the raw complex signals. A decimating Nyquist filter 12 is then used to simultaneously decimate the complex burst signals to M samples per symbol and to perform square root Nyquist matched filtering. In particular implementations, M may be two, meaning that the complex burst samples (plurality of burst samples) leaving the decimating Nyquist filter 12 are leaving at a sample rate that is two times the symbol rate. The burst samples include a certain number of samples associated with a preamble to the burst. It would be desirable to have the preamble include as few symbols as possible while still permitting accurate demodulation of the burst. In particular implementations, the preamble length may be 64 symbols for a QPSK modulated signal and 128 symbols for an 8PSK modulated signal.

The burst samples are received by a first frequency estimating module 14. The first frequency estimating module 14 determines the start of the preamble within the burst samples using a peak correlation detector. An example of a peak correlation detector that may be utilized in implementations of burst demodulators like those disclosed in this document may be found in U.S. Pat. No. 5,629,639 to Williams, entitled "Correlation Peak Detector," issued May 13, 1997, the disclosure of which is hereby incorporated entirely herein by reference. Once the start of the preamble is known, a plurality of computation samples are selected from among the plurality of burst samples. These computation samples will be utilized by the first frequency estimating module 14 in various calculations. The results of the calculations are then applied to all of the remaining samples in the burst.

The first frequency estimating module 14 is adapted to perform a complex correlation of the computation samples with the sign of a reference preamble pattern (a pattern representing what the preamble values should look like). In particular implementations, this is carried out by performing a dot product between the reference preamble pattern and the computation samples. Two vectors, a first vector of I samples and a second vector of Q samples are created, each of which represents the instantaneous phase of the received carrier signal relative to the reference preamble's carrier signal. The first frequency estimating module 14 is configured to take the time derivative of the first vector and second vector (the difference of the Nth and Nth+1 term and averaging the result) to produce a first calculated frequency offset value, which is accumulated in a vector and used in a dot product with the rest of the burst samples to remove a first frequency offset from the burst samples. Simulations (paper experiments) have indicated that in particular implementations the value of the first calculated frequency offset value can be within ±0.3% of the actual frequency offset value.

The signal to noise ratio (SNR) of the first frequency offset value can be improved if a predetermined number of the samples N in the first vector are added together and a predetermined number N of the samples in the second vector are added together. In particular implementations, the number of samples N may be represented as a percentage of the samples in the respective vector. The percentage of the samples that are added may be greater than 50% of the computation samples, i.e., if there were 10 samples in the vector, 6 of the 10 would be added together before the time derivative was taken. The improvement in the SNR comes at the expense of decreasing the maximum frequency offset can be resolved using the vector. Since the maximum phase change that can be resolved per sample is $\pm\pi$, then adding the samples together means that the maximum phase change that can be resolved is now $\pm\pi$ per the number of samples added together, rather than per sample.

At the same time, prior to, or after the taking of the dot product of the computation samples with the sign of the reference preamble, various calculations may be performed by the first frequency estimating module 16 (or subsequent modules, such as a third frequency estimating module 20) to determine a peak location of correlation magnitude ($T_0$) between the sign of the reference preamble and the computation samples. Two additional points of correlation magnitude are determined, one on each side of $T_0$, one called $T_{early}$, located one sample before $T_0$, and one called $T_{late}$, located one sample after $T_0$. The larger of $T_{early}$ and $T_{late}$ becomes $T_p$, or a reference location of correlation magnitude. These values will be used in subsequent computations with the computation samples.

The first frequency estimating module 14 is coupled to a second frequency estimating module 16, either directly, or through an automatic gain correction (AGC) module 18. The AGC module 18 serves to normalize the complex signals coming from the first frequency estimating module 14 and compensate for burst to burst power variations prior to processing by the second frequency estimating module 16. The second frequency estimating module 16 is adapted to perform basically the same computations with the computation samples and burst samples as the first frequency estimating module 14, except that a predetermined number of the samples from the vectors (which would be fifth and sixth vectors) resulting from the dot product of the computation samples with the sign of the reference preamble pattern are added together. In particular implementations, half of the samples in the vectors are added to the other half of the samples in the respective vector before the time derivative is taken to form seventh and eighth vectors and a second calculated frequency offset value. In implementations of burst demodulators 2 utilizing 8PSK that utilize a 128 symbol preamble, the accuracy of the frequency offset determination can be improved if the preamble is broken into two portions separated by P symbols, P being chosen to minimize the frequency offset error. Simulations (paper experiments) have indicated that choosing P to be 192 symbols creates a factor of three improvement in frequency estimation at low signal to noise ratios in particular implementations. After the seventh and eighth vectors have been formed, a dot product between the vectors and the remaining burst samples is used to remove a second frequency offset from the burst samples.

While in the burst demodulator 2 implementation illustrated in FIG. 1, a first frequency estimating module 14 and a second frequency estimating module 16 are used, in particular implementations only one of the two modules may be utilized, and, while the accuracy of the system may be decreased, the burst demodulator 2 may still be able to function as desired.

The processed burst samples and computation samples are then received by a third frequency estimating module 20 that is adapted to perform a matrix multiplication of the computation samples with the sign of the reference preamble pattern to generate a peak location of correlation $T_0$, which takes the form of a complex phase offset value. The third frequency estimating module 20 (peak detection module) also finds a correlation magnitude at a first location and at a second location on either side ($T_{early}$ and $T_{late}$) and defines a reference location of correlation magnitude ($T_p$) as the larger of $T_{early}$ or $T_{late}$ using the computation samples.

The burst samples and computation samples then are received by a clock phase estimating module 22 that is coupled to a temperature compensated crystal oscillator (TCXO) 24. The clock phase estimating module 22 is adapted to calculate a clock phase offset value (or the amount that the clock of the burst demodulator 2 is offset from the clock of the received signal). The module 22 is adapted to perform a matrix multiplication of the computation samples with the sign of the reference preamble at $T_0$, $T_{early}$, and $T_{late}$. The clock phase estimating module 22 is also adapted to use the ratio of $T_p$ to $T_0$ and whether $T_p$ is either $T_{early}$ or $T_{late}$ to calculate an index value for a look up table of coefficients for a fractional delay filter, which may be a finite impulse response (FIR) filter in particular implementations. The look up table may be included in a database or memory storage device associated with the clock phase module 22. The FIR filter is coupled with with the clock phase estimating module 22 and receives the remaining burst samples, processes them and sends them at the symbol rate to a data processing unit 26. In particular implementations, the FIR filter may be an all-pass, time delay filter coupled with a decimate by 2 function.

The TCXO 24 is used by the clock phase estimating module 22 to provide a reference for clock frequency offset correction. While a TCXO is less expensive than an oven controlled crystal oscillator (OCXO), an OCXO may be used in particular implementations if greater accuracy is desired; however, in many implementations of burst demodulators 2, the accuracy of a TCXO (which may be approximately 0.3 ppm in particular implementations) is sufficient. The ability to use a TCXO may be enhanced by the proper selection of the size of the burst, because if the clock phase error from the start to the finish of a burst is not greater than about 1%, no need exists to actually acquire the frequency of the clock in the received signals, just the phase. The foregoing means that bursts up to 33,333 symbols are within the range of error and, because in particular implementations the burst size may be less than 2500 symbols, the clock phase error limitation is readily met, allowing the use of a TCXO for clock phase acquisition while maintain clock stability on the demodulator side.

The data processing module 26 may include a forward error correction (FEC) decoder that utilizes short block turbo codes, short block low density parity check (LDPC) codes, or any other FEC code type to decode the data included in the processed burst samples and send them for further processing by other components in a telecommunications system. While particular implementations may utilize an FEC decoder, any of a wide variety of decoders adapted for specific encoding algorithm types could be utilized in particular implementations of burst demodulators 2.

Implementations of burst demodulators 2, like those illustrated in FIG. 1, utilize the preamble itself to determine the differences between bursts. Because it is the start of the preamble that is used to identify the difference between bursts, the preamble itself functions similarly to the unique word contained in conventional burst transmission preambles. Because there is no need to use specific symbols for frequency and clock acquisition per se, the size of the preamble can be reduced, since the computation samples used for frequency offset correction and clock phase estimation are drawn from the preamble directly. In addition no hardware feedback loops may need to be included in the burst demodulator 2 system implementations.

Figure 2:
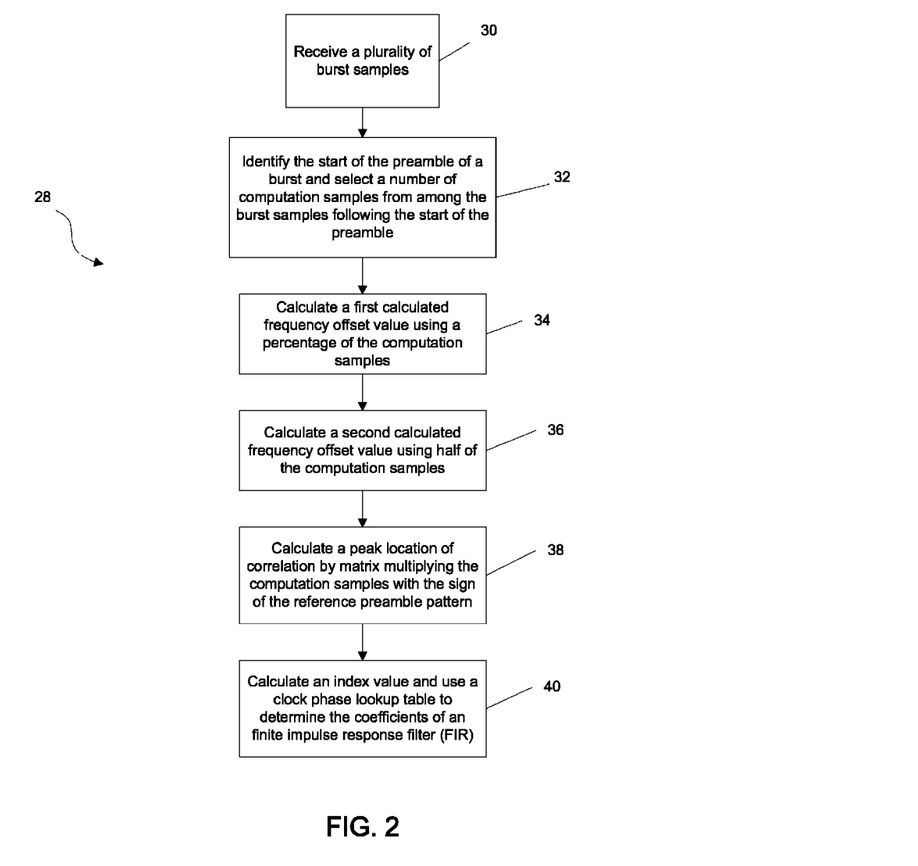
FIG. 2 is flowchart of an implementation of a first method of feed forward burst demodulation.

Implementations of burst demodulators 2 like those disclosed in this document may utilize various implementations of a first method of feed forward burst demodulation 28. Referring to FIG. 2, a flowchart of an implementation of the method 28 is illustrated, showing that the method 28 may include receiving a plurality of burst samples (step 30), identifying the start of the preamble of a burst (which may be accomplished using any of the methods disclosed in this document), and selecting a number of computation samples from among the burst samples following the start of the preamble (step 32). The method 28 may further include calculating a first calculated frequency offset value using a percentage of the computation samples (which may be greater than 50% in particular implementations) (step 34), and calculating a second calculated frequency offset value using half of the computation samples (while using half is disclosed, more or less than half of the samples may be used in various implementations) (step 36). The method 28 includes calculating a peak location of correlation by matrix multiplying the computation samples with the sign of the reference preamble pattern (step 38) and calculating an index value for and using a clock phase lookup table to determine the coefficients of an FIR filter (step 40). Implicit in the method 28 is processing the burst samples using the result of each of calculations involving the computation samples (e.g., processing the burst samples with the FIR filter) and sending the resulting processed burst samples to a data processing unit to recover the data in the burst samples.

Figure 3:
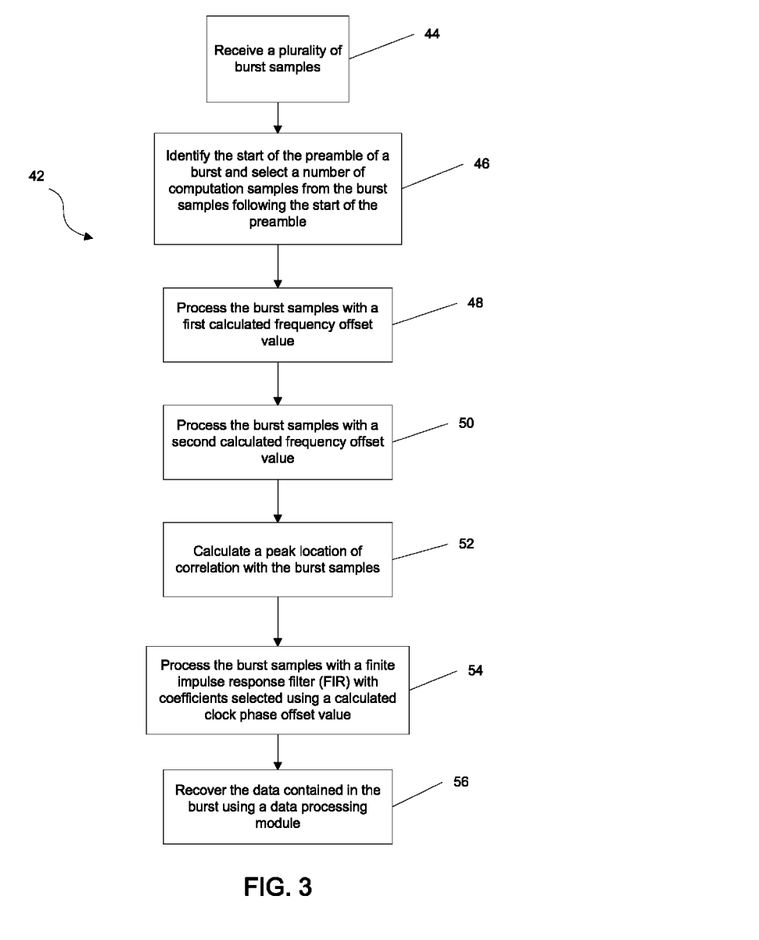
FIG. 3 is a flowchart of an implementation of a second method of feed forward burst demodulation.

Implementations of burst demodulators 2 like those disclosed in this document may utilize implementations of a second method of feed forward burst demodulation 42. Referring to FIG. 3, the method 42 includes receiving a plurality of burst samples (step 44), identifying the start of a preamble of a burst, and selecting a number of computation samples from the burst samples following the start of the preamble (step 46). The method 42 also includes processing the burst samples with a first calculated frequency offset value (step 48), processing the burst samples with a second calculated frequency offset value (step 50), and calculating a peak location of correlation with the burst samples (step 52). The method 42 also includes processing the burst samples with an FIR filter with coefficients selected using a calculated clock phase offset value (step 54) and recovering the data contained in the burst using a data processing module (step 56). Processing the burst samples with the second calculated frequency offset value may not be performed in particular implementations of the method 42; only processing with the first calculated frequency offset value may be performed in particular implementations. The various calculated frequency offset values and other values may be generated using any of the structures and methods disclosed in this document.

Figure 4A:
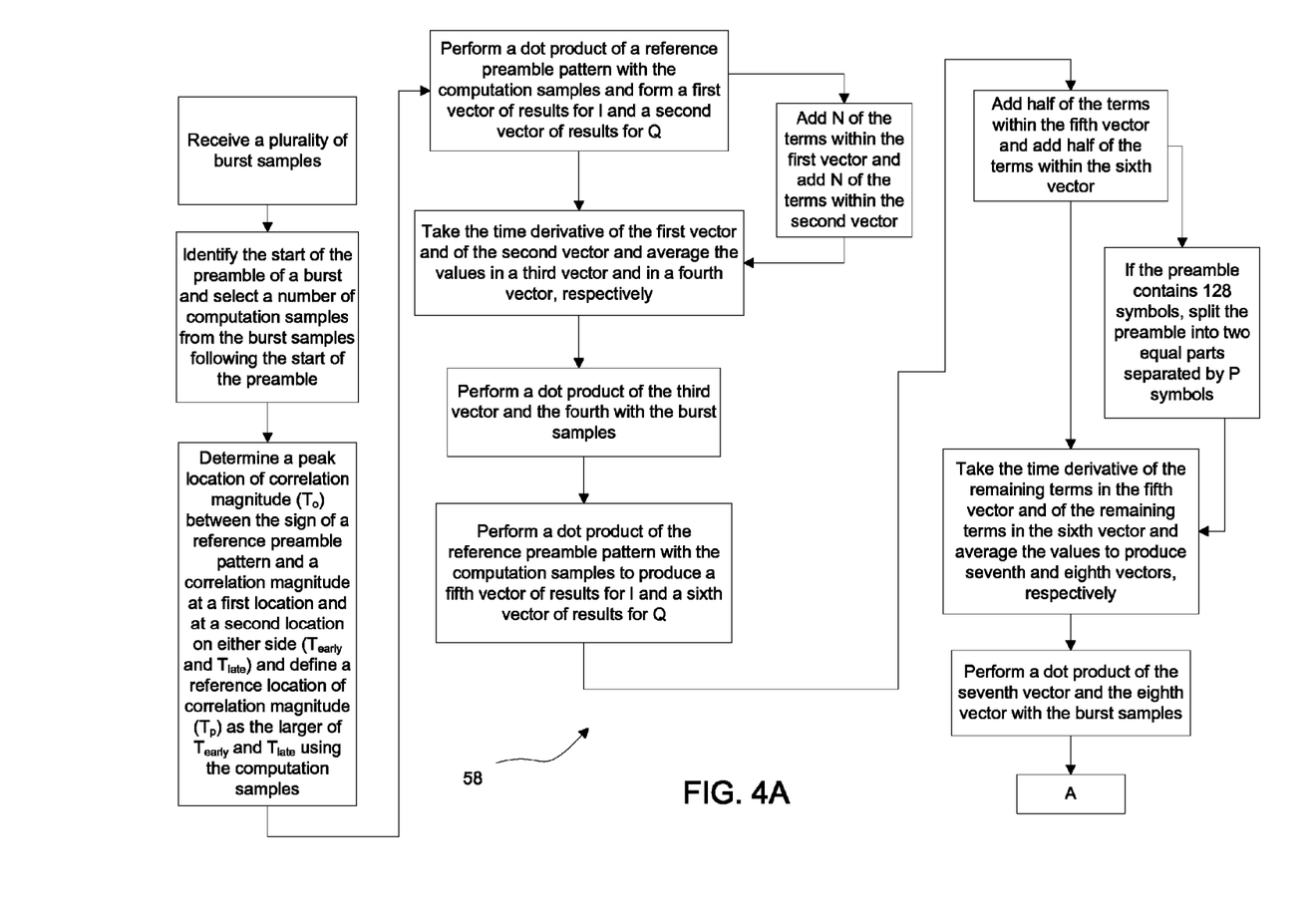
FIGS. 4A and 4B are flowcharts of an implementation of a third method of feed forward burst demodulation.

Referring to FIG. 4A, an implementation of a third method of feed forward burst demodulation 58 is illustrated. As illustrated, the method 58 includes receiving a plurality of burst samples and identifying the start of the preamble of a burst and selecting a number of computation samples from the burst samples following the start of the preamble. In particular implementations, a portion or all of the burst samples corresponding to the preamble may be selected, or portions of the preamble may be separated by burst samples that include data in some implementations. The method 58 also includes determining a peak location of correlation magnitude between the sign of a reference preamble pattern and a correlation magnitude at a first location and a second location on either side and defining a reference location of correlation magnitude as the larger of the first location or the second location of correlation magnitude using the computation samples. This determination of a peak location of correlation magnitude may take place at this point in particular implementations of the method 58, or at other sequential locations in the method flow. The method 58 includes performing a dot product of a reference preamble pattern with the computation samples and forming a first vector of results for I and a second vector of results for Q and taking the time derivative of the first vector and of the second vector and averaging the values in a third vector and in a fourth vector, respectively. In particular implementations, the method 58 may include adding N of the terms within the first vector and adding N of the terms within the second vector before taking the time derivative. The method 58 also includes performing a dot product of the third vector and the fourth vector with the burst samples and performing a dot product of the reference preamble pattern with the computation samples to produce a fifth vector of results for I and a sixth vector of results for Q.

As illustrated, the method 58 includes adding half of the terms within the fifth vector to the other half of the terms within the fifth vector and adding half of the terms within the sixth vector to the other half of the terms within the sixth vector. In particular implementations, more or less than half of the terms may be involved in the addition. In particular implementations, if the preamble includes 128 symbols (or more, in some implementations), the method 58 may include splitting the preamble into two equal parts separated by P symbols, which may be 192 symbols in various implementations. The method 58 also includes taking the time derivative of the remaining terms on the fifth vector and of the remaining terms in the sixth vector and averaging the values to produce seventh and eighth vectors, respectively, and performing a dot product of the seventh vector and the eighth vector with the burst samples.

Figure 4B:
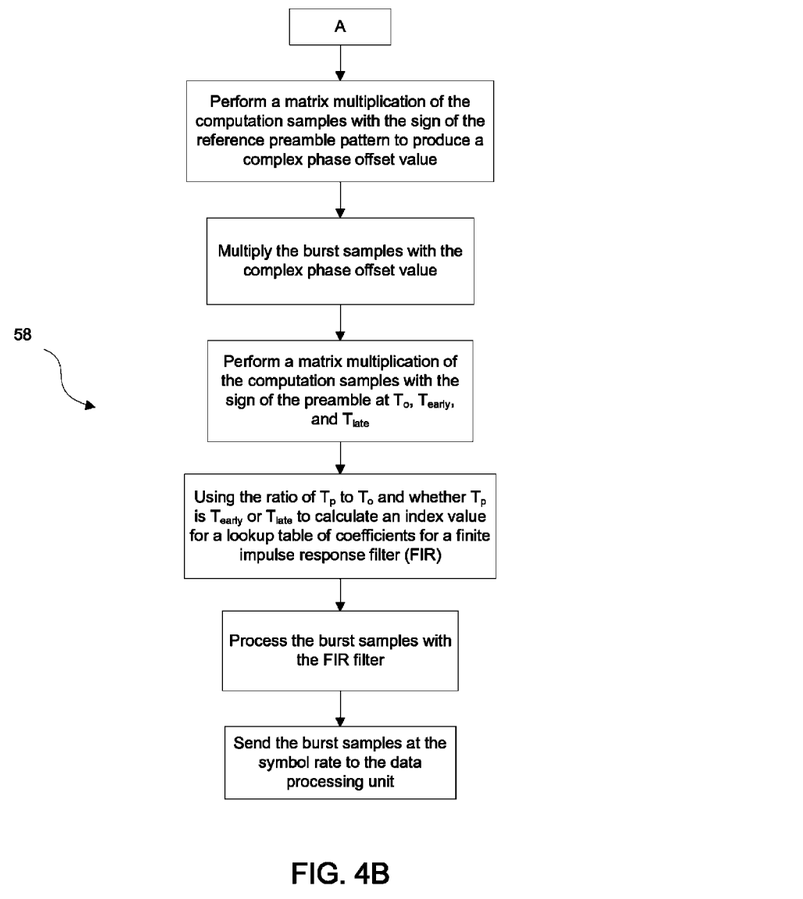

Referring to FIG. 4B, the method 58 includes performing a matrix multiplication of the computation samples with the sign of the reference preamble pattern to produce a complex phase offset value and multiplying the burst samples with the complex phase offset value. The method 58 also includes performing a matrix multiplication of the computation samples with the sign of the preamble at the peak location of correlation magnitude, the first location of correlation magnitude, and the second location of correlation magnitude, and using the ratio of the peak location of correlation magnitude to the reference location of correlation magnitude and whether the reference location of correlation magnitude is either the first or the second location of correlation magnitude to calculate an index value for a lookup table of coefficients for an FIR filter. The method 58 also includes processing the burst samples with the FIR filter using the selected coefficients and sending the burst samples at the symbol rate to a data processing unit.

In places where the description above refers to particular implementations of burst demodulators, it should be readily apparent that a number of modifications may be made without departing from the spirit thereof and that these implementations may be applied to other burst demodulators and related method implementations.

The invention claimed is:

1. A feed forward burst demodulator comprising:
   an analog to digital converter (A/D) coupled with a complex multiplier coupled with a direct digital synthesizer (DDS), the complex multiplier and DDS adapted to remove known frequency errors;
   a decimating Nyquist filter coupled with the complex multiplier and adapted to produce a plurality of burst samples comprising a plurality of preamble samples and a plurality of data samples;
   a first frequency estimating module coupled with the decimating Nyquist filter and adapted to receive the plurality of preamble samples, calculate a first calculated frequency offset value using the plurality of preamble samples, and remove a first frequency offset from the plurality of data samples using the first calculated frequency offset value;
   a second frequency estimating module coupled with the first frequency estimating module and adapted to receive the plurality of preamble samples, calculate a second calculated frequency offset value using the plurality of preamble samples, and remove a second frequency offset from the plurality of data samples using the second calculated frequency offset value;
   a third frequency estimating module coupled with the second frequency estimating module and adapted to receive the plurality of preamble samples and to calculate a peak location of correlation magnitude using the plurality of preamble samples;
   a clock phase estimating module coupled with the third frequency estimating module and adapted to receive the plurality of preamble samples and the peak location of correlation magnitude, calculate a clock phase offset value using the plurality of preamble samples and the peak location of correlation magnitude, select one or more coefficients for a finite impulse response (FIR) filter using the clock phase offset value, and process the plurality of data samples with the FIR filter; and
   a data processing module coupled with the clock phase estimating module and adapted to recover the data included in the plurality of data samples.

2. The system of claim 1, wherein the clock phase estimating module further comprises a temperature compensated crystal oscillator (TCXO).

3. The system of claim 1, wherein the clock phase estimating module further comprises an oven controlled crystal oscillator (OCXO).

4. The system of claim 1, wherein the data processing module is adapted to recover the data using a forward error correction (FEC) decoder with short block turbo codes.

5. The system of claim 1, wherein the data processing module is adapted to recover the data using a forward error correction (FEC) decoder with short block low density parity check (LDPC) codes.

6. The system of claim 1, wherein the system does not include a feedback loop adapted to correct frequency offset during burst acquisition.

7. The system of claim 1, wherein the system includes one or more automatic gain control (AGC) modules.

8. The system of claim 1, wherein the plurality of preamble samples is a unique word adapted to demodulate the burst.

9. A method of feed forward burst demodulation comprising:
receiving a plurality of burst samples, the burst samples comprising decimated complex samples from a plurality of received symbols in a burst transmission;
identifying the start of a preamble of a burst within the plurality of burst samples;
selecting a plurality of computation samples from the burst samples that follow the start of the preamble in a sequence of the burst samples;
calculating a first calculated frequency offset using a predetermined first percentage of the computation samples and processing the burst samples with the first calculated frequency offset value;
calculating a second calculated frequency offset using a predetermined second percentage of the computation samples and processing the burst samples with the second calculated frequency offset value;
calculating a peak location of correlation magnitude using the computation samples;
calculating an index value for a clock phase lookup table using the computation samples and the peak location of correlation magnitude;
determining coefficients for a finite impulse response (FIR) filter using the clock phase lookup table and the index value;
processing the burst samples through the FIR after calculating the index value; and
retrieving data from the burst samples using a data processing module.

10. The method of claim 9, wherein calculating the second calculated frequency offset further comprises splitting the preamble into two equal parts separated by a predetermined number of symbols if the preamble comprises 128 symbols.

11. The method of claim 9, wherein the predetermined first percentage of the computation samples is greater than 50 percent of the computation samples and the predetermined first percentage is created by adding one or more of the computation samples together.

12. The method of claim 9, wherein the predetermined second percentage of the computation samples is 50% of the computation samples and the predetermined second percentage is created by adding half of the computation samples to the other half of the computation samples.

13. A method of feed forward burst demodulation comprising:
receiving a plurality of burst samples, the burst samples comprising decimated complex samples from a plurality of received symbols in a burst transmission;
identifying the start of a preamble of a burst within the plurality of burst samples;
selecting a plurality of computation samples from the burst samples that follow the start of the preamble in a sequence of the burst samples;
determining a peak location of correlation magnitude between a sign of a reference preamble pattern and the computation samples and determining a correlation magnitude at a first location and a correlation magnitude at a second location on each side of the peak location of correlation magnitude and defining as a reference location of correlation magnitude the larger of the correlation magnitude at the first location or the correlation magnitude at the second location;
performing a dot product of the reference preamble pattern with the computation samples and forming a first vector of real results and a second vector of imaginary results;
taking the time derivative of the first vector and of the second vector and averaging the resulting values to form a third vector and a fourth vector, respectively;
performing a dot product of the third vector and the fourth vector with the plurality of burst samples;
performing a dot product of the reference preamble pattern with the computation samples to produce a fifth vector of real results and a sixth vector of imaginary results;
adding a predetermined number of the terms within the fifth vector to a predetermined number of terms within the fifth vector and adding a predetermined number of the terms within the sixth vector to a predetermined number of the terms within the sixth vector;
taking the time derivative of the remaining terms in the fifth vector and in the sixth vector and averaging the resulting values, respectively, to produce seventh and eighth vectors;
performing a dot product of the seventh vector and the eighth vector with the plurality of burst samples;
performing a matrix multiplication of the computation samples with the sign of the reference preamble pattern to produce a complex phase offset value;
multiplying the plurality of burst samples with the complex phase offset value;
performing a matrix multiplication of the computation samples with the sign of the preamble at the peak location of correlation magnitude, the first location of correlation magnitude, and the second location of correlation magnitude;
calculating an index value for a lookup table of coefficients for a finite impulse response filter (FIR) using the ratio of the reference location of correlation magnitude to the peak location of correlation magnitude and whether the reference location of correlation magnitude is the first location of correlation magnitude or the second location of correlation magnitude;
processing the burst samples with the FIR filter; and
sending the burst samples at the symbol rate to the data processing unit.

14. The method of claim 13, further comprising adding a predetermined number of the terms within the first vector to a predetermined number of the terms within the first vector and adding a predetermined number of terms within the second vector to a predetermined number of terms within the second vector before taking the time derivative of the first vector and of the second vector.

15. The method of claim 14, wherein adding a predetermined number of the terms further comprises adding more than 50% of the terms in each of the respective vectors together.

16. The method of claim 13, further comprising splitting the preamble into two equal parts separated by a predetermined number of symbols if the preamble contains 128 symbols.

17. The method of claim 16, wherein splitting the preamble into two equal parts separated by a predetermined number of symbols further comprises separating the two equal parts by 192 symbols.

18. The method of claim 14, wherein adding a predetermined number of the terms within the fifth vector to a predetermined number of terms within the fifth vector and adding a predetermined number of the terms within the sixth vector to a predetermined number of the terms within the sixth vector further comprises adding half of the terms in each of the respective vectors together.

\* \* \* \* \*